United States Patent [19]
Hanson

[11] Patent Number: 5,436,967
[45] Date of Patent: Jul. 25, 1995

[54] HELD PARTY CALL-BACK ARRANGEMENT

[75] Inventor: Thomas C. Hanson, Boulder, Colo.

[73] Assignee: AT&T Corp., Murray Hill, N.J.

[21] Appl. No.: 190,805

[22] Filed: Feb. 1, 1994

[51] Int. Cl.6 .............................................. H04M 3/48
[52] U.S. Cl. ...................... 379/266; 379/265; 379/266; 379/309; 379/216
[58] Field of Search ............... 379/215, 208, 210, 212, 379/213, 67, 88, 89, 266, 265, 216, 140, 209, 162, 393, 163, 201, 309

[56] References Cited

U.S. PATENT DOCUMENTS

| | | | |
|---|---|---|---|
| 4,731,822 | 3/1988 | Berry, III et al. | 379/204 |
| 5,023,868 | 6/1991 | Davidson et al. | 370/62 |
| 5,095,504 | 3/1992 | Nishikawa et al. | 379/212 |
| 5,155,761 | 10/1992 | Hammond | 379/67 |
| 5,185,782 | 2/1993 | Srinivasan | 379/67 |
| 5,214,688 | 5/1993 | Szlam et al. | 379/67 |
| 5,247,569 | 9/1993 | Cave | 379/140 |
| 5,309,505 | 5/1994 | Szlam et al. | 379/88 |
| 5,311,574 | 5/1994 | Livanos | 379/88 |
| 5,329,583 | 7/1994 | Jurgensen et al. | 379/266 |

FOREIGN PATENT DOCUMENTS

| | | | |
|---|---|---|---|
| 58-249403 | 7/1985 | Japan | H04Q 3/58 |
| 61-167258 | 7/1986 | Japan | H04M 3/42 |
| 2227198 | 4/1992 | Japan | 379/201 |

*Primary Examiner*—James L. Dwyer
*Assistant Examiner*—Parag Dharia

[57] ABSTRACT

In response to a first party (19) being on hold a call that had been established between the first party and a second party (11), the second, holding, party is given an option, by an automated arrangement such as an adjunct processor (21) associated with the first party's local switching system (15), of either remaining on hold or being called back. If the holding party chooses to be called back, the held call is torn down. Later, when the first party attempts to take the call off hold, the automated arrangement instead causes a new call to be placed to the calling telephone number of the torn-down call and to be established between the parties to serve as a substitute for the torn-down call.

25 Claims, 2 Drawing Sheets

HELD PARTY CALL-BACK ARRANGEMENT

TECHNICAL FIELD

This invention relates to telecommunications systems generally, and in particular relates to user features of telephone systems.

BACKGROUND OF THE INVENTION

A common experience of callers to service bureaus and businesses is that they are put on hold while the called party goes off to find information, make confirmations, check stock, take another call, etc. "Hold" is a call state invoked by a party to the call via signalling from his or her telephone set that results in the call being disconnected from that party's telephone set but remaining connected to the switching system that serves that party's telephone set, ready to be reconnected to that party's telephone set on demand.

Being placed on hold for more than a few seconds is normally an unpleasant and frustrating experience for most people. It is waiting time, unproductive time that could be better-spent doing other things. As a consequence, significant numbers of people who are put on hold for more than a brief time usually abandon their calls and hang up in resentment and frustration. The result is bad customer relations, wasted effort, and lost business for the service bureaus or businesses that put the people on hold. Furthermore, the hold state results is a waste of telephone network resources. It unproductively ties up the held party's telephone set as well as the telephone lines, trunks, and switching resources being used to maintain the connection of the held call from the held party to the switching system serving the other party. If freed, these resources could be used productively for other calls.

To combat a related problem—call abandonment due to delays in service-bureau agents answering and handling calls in the first place—many call centers have in recent years implemented automatic call-back systems. These work generally as follows. When an incoming call is not answered by an agent within a predetermined period of time (e.g., three rings), a call-back system automatically answers the call and plays a pre-recorded announcement to the caller giving him or her the option of either having the call placed in a queue to wait for an agent to pick it up, or hanging up and being called back when an agent becomes available. If the caller selects the call-back option, the system either obtains the caller's telephone number automatically from the telephone network by means of Automatic Number Identification (ANI), or requests the number from the caller. The caller then hangs up. When an agent becomes available, the system uses the caller's number to automatically place a new call to the caller and connects the call to the available agent. Illustrative systems of this nature are disclosed in U.S. Pat. Nos. 5,185,782 and 5,155,761. Unfortunately, such automatic call-back systems do nothing to alleviate the first-mentioned problem resulting from a caller being placed on hold by the agent, after the call has been connected to the agent and handling of the call by the agent has commenced.

In an attempt to alleviate these problems, a number of arrangements have been proposed that alert the party that has been placed on hold to when he or she is taken off hold. The alerting normally takes the form of an audio signal generated at the held party's telephone set. Its function is to allow the party who has been placed on hold to relax or do something else instead of having to cradle the telephone handset to his or her ear listening for the other party to return and take the call off hold. By thus making the time spent on hold less annoying for the held parties, these arrangements are effective in reducing the instances of the held parties abandoning the calls. Illustrative examples of such arrangements are disclosed in U.S. Pat. No. 4,731,822 and Japanese Pat. No. 60-136498. Unfortunately, these arrangements are often complex and expensive to implement, and difficult or impossible to retrofit into existing telephone networks. Moreover, they do nothing to cure the aforementioned problem of waste of telephone network resources that results from a call languishing in the on-hold state.

SUMMARY OF THE INVENTION

This invention is directed to solving these and other problems and disadvantages of the prior art. Generally according to the invention, the holding party to a call that has been placed on hold is given an option by an automated arrangement of either remaining on hold or being called back. If the holding party chooses to be called back, the held call is torn down. When the other party to the call then attempts to take the call off hold, the automated arrangement causes a new call to be established between the parties. The new call serves as a substitute for the torn-down call. The formerly-holding party is thereby relieved of the tedium associated with being on hold, and the telephone system resources that would otherwise be consumed by the held call are released and made available for other calls.

Specifically according to the invention as claimed, in response to a first party placing on hold a first call that is established between the first party and a second party, the first call is torn down. Then in response to the first party attempting to take the first call off hold, a new, second, call is set up between the first party and the second party. Preferably, when the first call is placed on hold, the second party is given an option to either remain on hold or be called back. If the second party elects to be called back, the first call is torn down; otherwise the first call remains on hold. The first party to the torn-down call is monitored for an attempt to take the first call off hold. When such an attempt by the first party is detected, the first party is informed that the first call has been torn down and preferably is given the option of having or not having the connection to the second party re-established. If the first party chooses the option of having the connection re-established, or if the option is not given, the second call is set up to take the place of the first call. The second call is set up to the second party, and is connected to the first party only when the second party answers.

These and other advantages and features of the invention will become more apparent from the following description of an illustrative embodiment of the invention taken together with the drawing.

DETAILED DESCRIPTION

Figure 1:
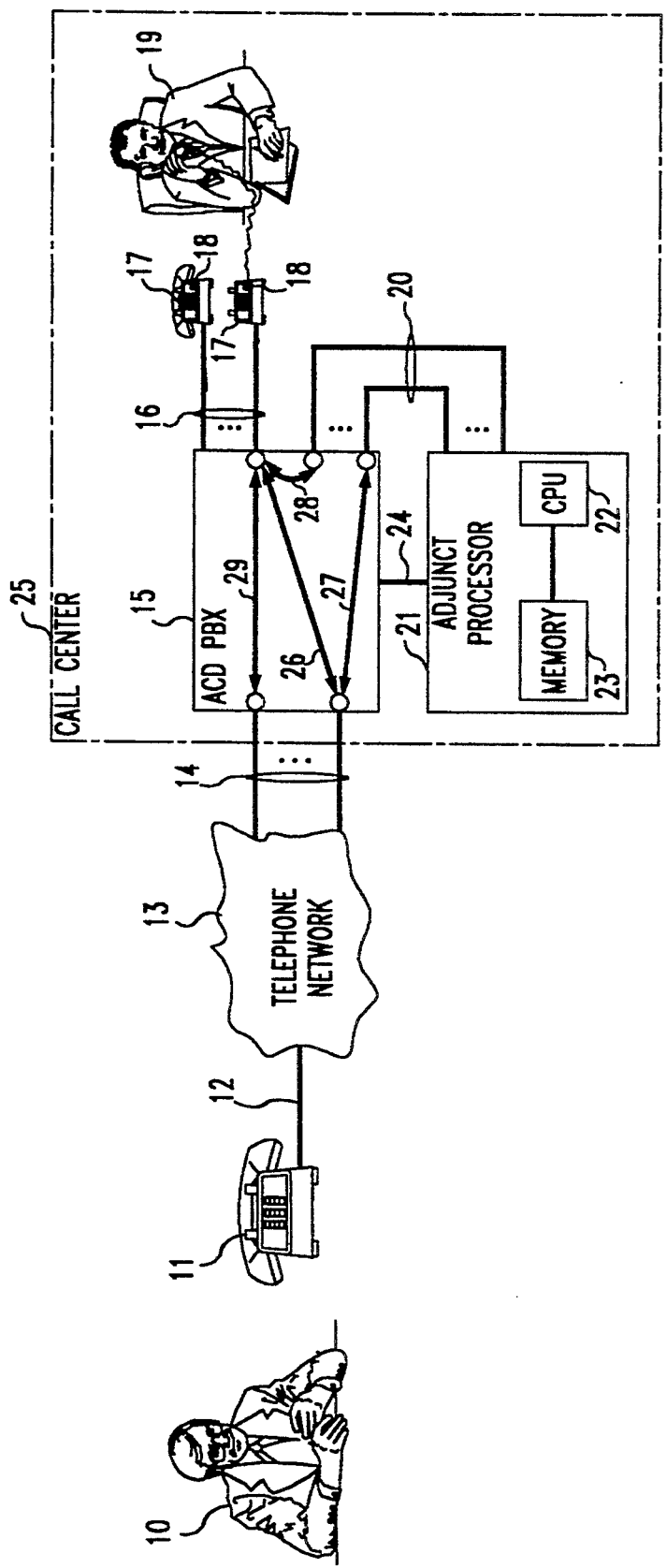
FIG. 1 is a block diagram of an illustrative telephone network that incorporates an illustrative embodiment of the invention.

FIG. 1 shows in block form an illustrative telephone network 13 that incorporates an illustrative embodiment of the invention. Pieces of network 13 are shown broken out therefrom to facilitate a more detailed discussion thereof. Network 13 is substantially conventional, comprising, for example, the public telephone network. It includes a telephone 11 by means of which a user 10 places telephone calls to other parts of network 13, such as a call center 25. Telephone 11 is connected to the rest of network 13 by a telephone line 12; call center 25 is connected to the rest of network 13 by telephone trunks 14.

Call center 25 is illustratively a service bureau where a plurality of agents 19 handle telephone calls. It conventionally comprises an automatic call distribution (ACD) private branch exchange (PBX) 15 that distributes and connects calls to agent terminals 17. Terminals 17 are connected to PBX 15 via lines 16. Each terminal 17 includes a hold button 18 by means of which agents 19 put calls on hold. Call center 25 further includes an adjunct processor 21 that provides call-processing features that supplement those provided by PBX 15. Adjunct processor 21 is connected to PBX 15 by telephone lines 20 and by a control data link 24. The use of adjunct processors to provide various features is well-known in the art. An illustrative example thereof is disclosed in U.S. Pat. No. 5,023,868, which is hereby incorporated herein by reference.

Both PBX 15 and adjunct processor 21 are stored-program controlled machines. PBX 15 is illustratively an AT&T Definity ® PBX, and adjunct processor 21 is illustratively an AT&T Conversant ® voice interactive system. Link 24 is illustratively the AT&T ISDN Gateway link. Adjunct processor 21 includes a central processing unit (CPU) 22 for executing programs, and a memory 23 for storing programs and data for use by CPU 22.

As described so far, network 13 of FIG. 1 is conventional. A call is handled in network 13 in a conventional manner as follows. Caller 10 places a call to call center 25 by entering the telephone number of call center 25 on telephone 11. Telephone network 13 sets up the call to PBX 15 and supplies to PBX 15 both the calling and the called number. PBX 15 connects the call to adjunct processor 21 by establishing a connection 27 to a telephone line 20, and supplies the calling and called number to adjunct processor 21 via control link 24. Alternatively, if PBX 15 does not automatically supply the calling and/or called number, adjunct processor 21 prompts caller 10 for this information prior to proceeding. Adjunct processor 21 then performs its designated functions and directs PBX 15 to connect the call to terminal 17 of an available agent 19. PBX 15 does so by establishing a connection 26. Connection 27 is maintained, whereby adjunct processor 21 remains bridged onto the call. If and when agent 19 who is handling the call puts the call on hold by pressing hold button 18 on his or her terminal 17, PBX 15 breaks connection 26 and thereby disconnects the call from terminal 17 of agent 19. But, in all other respects, the call remains established in network 13. When agent 19 takes the call off hold by again pressing hold button 18, PBX 15 re-establishes connection 26 to re-connect the call to terminal 17 of agent 19. When user 10 or agent 19 hangs up, PBX 15 ends the call by breaking connections 26 and 27. Telephone network 13 also tears down the call connection from the caller's terminal 11 to PBX 15.

Figure 2:
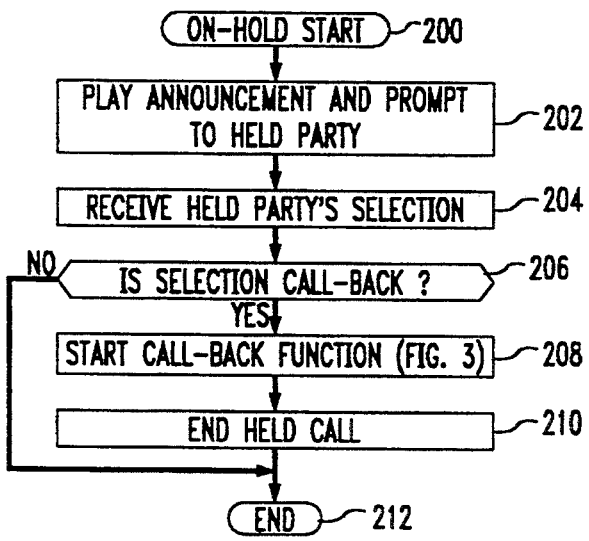
FIG. 2 is a flow diagram of an on-hold call-processing function of an adjunct processor of the network of FIG. 1.

According to one illustrative example of the invention, an embodiment of the invention is implemented by programs residing in memory 23 and executed by CPU 22 of adjunct processor 21. These programs are flowcharted in FIGS. 2 and 3. The above-described call-handling scenario remains the same until agent 19 puts the call on hold and PBX 15 breaks connection 26. Since adjunct processor 21 is bridged onto the call via connection 27, it senses the on-hold condition, and in response it invokes execution of the program flowcharted in FIG. 2, at step 200. Adjunct processor 21 plays a pre-recorded message to held party 10 via connection 27, announcing that held party 10 has a choice of remaining on hold or being called back, and prompting held party 10 to indicate his or her selection by entering one of two codes (e.g., pressing one of two Touch-Tone buttons) on his or her telephone 11, at step 202. Adjunct processor 21 receives the held party's selection via connection 27, at step 204. If held party 10 selected to remain on hold, as determined at step 206, execution of the program flowcharted in FIG. 2 ends, at step 212, and the call proceeds conventionally. If held party 10 selected to be called back, as determined at step 206, adjunct processor 21 invokes execution of a call-back program flowcharted in FIG. 3, at step 208. Adjunct processor 21 then directs PBX 15 via link 24 to tear down the call, at step 210, and ends execution of the program of FIG. 2, at step 212. PBX 15 responds to the directive to tear down the call that was given at step 210 in the same manner as if agent 19 had hung up, and breaks connections 26 and. 27. Telephone network 13 also tears down the call connection from the held party's terminal 11 to PBX 15.

Figure 3:
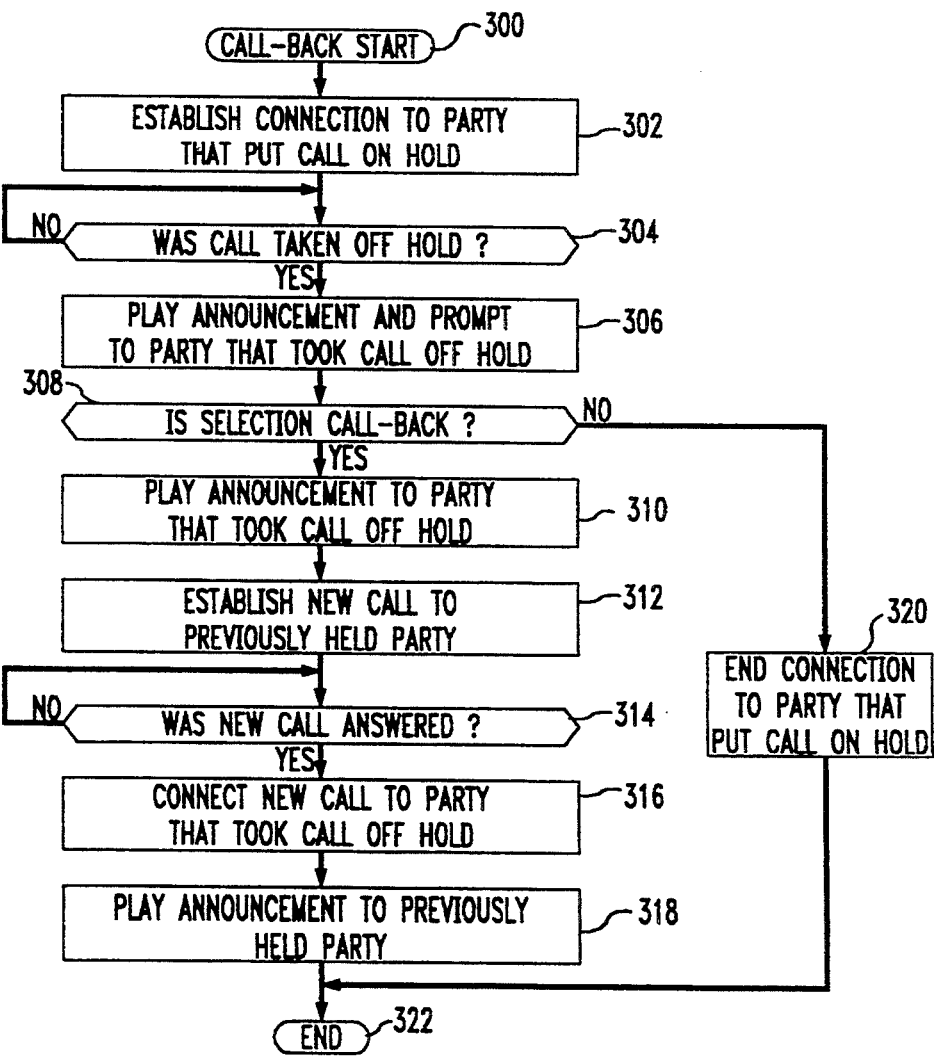
FIG. 3 is a flow diagram of a call-back call-processing function of the adjunct processor of the network of FIG. 1.

Turning to FIG. 3, upon invocation of execution of this program, at step 300, adjunct processor 21 requests PBX 15 via link 24 to connect adjunct processor 21 to terminal 17 of agent 19 who is handling the held call, at step 302. PBX 15 replies by establishing a connection 28 between line 16 of the agent's terminal 17 and a line 20 of adjunct processor 21. Adjunct processor 21 then monitors terminal 17 via connection 28 for pressing of button 18, at step 304. As is conventional, pressing of button 18 indicates that agent 19 is taking the held call off hold. In response thereto, adjunct processor 21 plays a pre-recorded announcement to agent 19 via connection 28 advising him or her that the call had been torn down because the held party requested to be called back, and prompting agent 19 to indicate via Touch-Tone input whether or not a connection to the held party should be re-established. If agent 19 indicates a desire to not have the connection reestablished, as determined at step 308, adjunct processor 21 requests PBX 15 via link 24 to break connection 28, at step 220, and then ends its operation, at step 322. If agent 19 indicates a desire to have the connection re-established, as determined at step 308, adjunct processor 21 plays a pre-recorded announcement message asking agent 19 to wait for a connection to be re-established, at step 310. (Alternatively, steps 308 and 320 may be eliminated.) Adjunct processor 21 then directs PBX 15 via link 24 to set up a new call to the party 10 that was previously on hold, at step 312. Adjunct processor 21 gives PBX 15 the calling number that it received when the original call from user 10 was received as the number to which the new call is to be established. When the new call is established and user 10 picks up the call at telephone 11, as determined at step 314, adjunct processor 21 directs PBX to connect the call to agent 19, at step 312. PBX 15 does so by establishing connection 29. Adjunct processor 21 then plays an announcement directed to user 10 and indicating that this is a call-back on the call that had been put on hold, at step 318. Adjunct processor 21 then ends execution of the program of FIG. 3, at step 322, but remains bridged onto the call via connection 28. Processing of the call thus returns to conventional processing, as if the new call were the original call.

Of course, various changes and modifications to the illustrative embodiment described above will be apparent to those skilled in the art. For example, instead of being implemented in an adjunct processor, the on-hold and call-back call-processing functions may be implemented in the PBX or other switching system that is directly serving the party that put the call on hold. Such changes and modifications can be made without departing from the spirit and the scope of the invention and without diminishing its attendant advantages. It is therefore intended that such changes and modifications be covered by the following claims.

I claim:

1. A call-processing method comprising the steps of:
in response to a first party placing on hold a first call that is established between the first party and a second party, tearing down the first call; and in response to the first party attempting to take the first call off hold, setting up a new, second, call between the first party and the second party.

2. The method of claim 1 wherein:
the step of tearing down comprises the steps of
notifying the second party of an option to either remain on hold or be called back, and
in response to receiving a selection from the second party of the option to be called back, tearing down the first call; and
the step of setting up comprises the steps of
in response to detecting an attempt by the first party to take the first call off hold, notifying the first party of the tearing down of the first call, and
in response to said detection, setting up the new second call between the first party and the second party.

3. The method of claim 2 further comprising the step of:
placing the first call on hold prior to the step of notifying the second party; and
in response to receiving said selection from the second party of the option to remain on hold, maintaining the first call on hold until the first party takes the first call off hold.

4. The method of claim 2 wherein
the step of notifying the first party comprises the step of
notifying the first party of an option to have or not to have a connection with the second party re-established; and
the step of setting up comprises the step of
in response to receiving a selection from the first party of the option to have the connection re-established, setting up the new second call to serve as a substitute for the first call.

5. The method of claim 2 wherein the step of setting up comprises the steps of:

setting up the new second call to the second party; and
in response to the new second call being answered by the second party, connecting the new second call to the first party.

6. A call-processing method comprising the steps of:
in response to a first party placing on hold a first call that is established between the first party and a second party, inquiring of the second party whether the second party wishes to remain on hold or wishes to be called back;
in response to receiving an indication from the second party that the second party wishes to be called back, tearing down the first call;
in response to receiving said indication, monitoring the first party to detect an attempt by the first party to take the first call off hold;
in response to detecting said attempt, notifying the first party of the tearing down; and
in response to said detecting, setting up a new, second, call between the first party and the second party to serve as a substitute for the first call.

7. The method of claim 6 wherein the step of inquiring comprises the steps of
in response to a signal from the first party to place the first call on hold, placing the first call on hold;
in response to said placing, inquiring whether the second party wishes to remain on hold or wishes to be called back.

8. The method of claim 7 further comprising the step of
in response to receiving the indication from the second party that the second party wishes to remain on hold, maintaining the first call on hold.

9. The method of claim 6 wherein
the step of notifying the first party comprises the steps of
notifying the first party of an option to have or not to have a connection with the second party re-established; and
the step of setting up comprises the step of
in response to receiving a selection from the first party of the option to have the connection re-established, setting up the new second call.

10. The method of claim 8 wherein the step of setting up the new second call comprises the steps of
setting up the new second call to the second party, and
in response to the new second call being answered by the second party, connecting the new second call to the first party.

11. The method of claim 6 further comprising the step of in response to receiving the first call from the second party and a call address of the second party, connecting the first call to the first party to establish the first call between the first party and the second party; wherein
the step of setting up comprises the step of
setting up the new second call to the call address of the second party to re-establish a call connection between the first party and the second party.

12. A method of processing a call in a telecommunications arrangement comprising a switching system, and a terminal and an adjunct processor connected to the switching system, comprising the steps of:
in response to receiving a first call and a calling number for the first call at the switching system, the switching system connecting the first call to the terminal and supplying the calling number to the adjunct processor;

the terminal placing the first call on hold;

in response to the placing on hold, the adjunct processor announcing on the first call an option to either remain on hold or be called back;

in response to the adjunct processor receiving via the call a selection of the call-back option, the adjunct processor causing the switching system to tear down the call and the adjunct processor monitoring the terminal for an attempt to take the first call off hold;

the terminal attempting to take the call off hold;

in response to the attempt, the adjunct processor notifying the terminal of the tearing down of the first call;

in response to the attempt, the adjunct processor causing the switching system to establish a new, second, call to the calling number of the first call; and in response to establishment of the second call, the adjunct processor causing the switching system to connect the second call to the terminal.

13. An arrangement comprising:

means for tearing down a first call that is established between a first party and a second party, in response to the first party placing the first call on hold; and means for setting up a new, second, call between the first party and the second party, in response to the first party attempting to take the first call off hold.

14. The arrangement of claim 13 wherein:

the tearing-down means comprise means for notifying the second party of an option to either remain on hold or be called back, and means responsive to receiving a selection from the second party of the option to be called back, for tearing down the first call; and the setting-up means comprise means responsive to an attempt by the first party to take the first call off hold, for notifying the first party of the tearing down of the first call, and means responsive to said attempt, for setting up the new second call between the first party and the second party.

15. The arrangement of claim 14 further comprising:

means for placing the first call on hold prior to notifying of the second party; and means responsive to receiving the selection from the second party of the option to remain on hold, for maintaining the first call on hold until the first party takes the first call off hold.

16. The arrangement of claim 14 wherein the means for notifying the first party comprise means for notifying the first party of an option to have or not to have a connection with the second party re-established; and the setting-up means comprise means responsive to receiving a selection from the first party of the option to have the connection re-established, for setting up the new second call to serve as a substitute for the first call.

17. The arrangement of claim 14 wherein the setting-up means comprise:

means for setting up the new second call to the second party; and means responsive to the new second call being answered by the second party, for connecting the new second call to the first party.

18. A call-processing arrangement comprising:

means responsive to a first party placing on hold a first call that is established between the first party and a second party, for inquiring of the second party whether the second party wishes to remain on hold or wishes to be called back;

means responsive to receiving an indication from the second party that the second party wishes to be called back, for effecting a tearing-down of the first call;

means responsive to receiving said indication, for monitoring the first party to detect an attempt by the first party to take the first call off hold;

means responsive to detecting said attempt, for notifying the first party of the tearing down; and means responsive to said detecting, for effecting a setting-up of a new, second, call between the first party and the second party to serve as a substitute for the first call.

19. The arrangement of claim 18 wherein the inquiring means comprise means responsive to the first call being placed on hold in response to a signal from a first party to place the first call on hold, for inquiring whether the second party wishes to remain on hold or wishes to be called back.

20. The arrangement of claim 19 further comprising means for maintaining the first call on hold upon receipt of the indication from the second party that the second party wishes to remain on hold.

21. The arrangement of claim 18 wherein the means for notifying the first party comprise means for notifying the first party of an option to have or not to have a connection with the second party re-established; and the setting-up means comprise means responsive to receiving a selection from the first party of the option to have the connection re-established, for effecting the setting-up of the new second call.

22. The arrangement of claim 20 wherein the means for setting up the new second call comprise means for effecting the setting-up of the new second call to the second party, and means responsive to the new second call being answered by the second party, for effecting a connecting of the new second call to the first party.

23. The arrangement of claim 18 further comprising means responsive to receiving the first call from the second party and a call address of the second party, for effecting a connecting of the first call to the first party to establish the first call between the first party and the second party; wherein the setting-up means comprise means for effecting the setting-up of the new second call to the call address of the second party to re-establish a call connection between the first party and the second party.

24. A telecommunications arrangement comprising:

a terminal;

an adjunct processor;

a switching system connected to the terminal and to the adjunct processor and responsive to establishment of a first call between the terminal and one of a calling and a called number, for supplying the one of the calling and the called number to the adjunct processor;

hold means in the terminal for placing calls connected to the terminal on hold and taking the on-hold calls off hold., cooperatively with the switching system;

means in the adjunct processor responsive to the first call being placed on hold, for announcing on the first call an option to either remain on hold or be called back;

means in the adjunct processor responsive to receiving via the call a selection of the call-back option, for causing the switching system to tear down the call;

means in the adjunct processor responsive to said receiving, for monitoring the terminal for an attempt to take the first call off hold;

means in the adjunct processor responsive to an attempt to take the first call off hold, for notifying the terminal of the tearing down of the first call;

means in the adjunct processor responsive to the attempt, for causing the switching system to establish a new second call to the calling number of the first call; and means in the adjunct processor responsive to establishment of the second call, for causing the switching system to connect the second call to the terminal.

25. An adjunct processor for a telecommunications arrangement comprising a terminal having an ability to place calls connected to the terminal on hold and to take the on-hold calls off hold, and a switching system responsive to establishment of a first call between the terminal and one of a called and a calling number for connecting the first call to the terminal and supplying the one of the calling and the called number to the adjunct processor, the adjunct processor comprising:

means responsive to the first call being placed on hold, for announcing on the first call an option to either remain on hold or be called back;

means responsive to receiving via the first call a selection of the call-back option, for causing the switching system to tear down the call;

means responsive to said receiving, for monitoring the terminal for an attempt to take the first call off hold;

means responsive to an attempt to take the first call off hold, for notifying the terminal of the tearing down of the first call;

means responsive to the attempt, for causing the switching system to establish a new second call to the calling number of the first call; and means responsive to establishment of the second call, for causing the switching system to connect the second call to the terminal.

* * * * *